Patented June 5, 1951

2,555,361

UNITED STATES PATENT OFFICE 2,555,361

METHOD FOR THE PURIFICATION OF TITANIUM TETRACHLORIDE

Walter K. Nelson and Helmut Espenschied, Metuchen, N. J., assignors to National Lead Company, New York, N. Y., a corporation of New Jersey No Drawing. Application November 25, 1949, Serial No. 129,496

5 Claims. (Cl. 202—57)

This invention relates to a method for the purification of titanium tetrachloride. More specifically it relates to a simple and economical process for purifying the so-called "commercial grade" or "crude" titanium tetrachloride. Still more specifically it relates to reducing the vanadium content of impure titanium tetrachloride.

Crude titanium tetrachloride as manufactured and sold as an article of commerce is a relatively impure product which has a decidedly deep, yellow color. This material may be commercially prepared by processes involving the chlorination of titaniferous iron ores or rutile ores and invariably the product is contaminated by various impurities, which are likewise chlorinated or are carried over with the titanium values.

The crude titanium tetrachloride is unsuitable as a raw material in various processes which demand high purity, such as in the manufacture of titanium metal, titanium pigments, and other titanium compounds. In these processes the crude titanium tetrachloride must be purified before it can be utilized.

Operational difficulties are usually encountered in prior methods for the purification of titanium tetrachloride, because of the type and nature of the treating agents employed. Some of these agents are added in large quantities and form voluminous open-structured masses which retain large amounts of titanium tetrachloride resulting in high losses of unrecoverable titanium tetrachloride. Other agents form sticky masses which are inconvenient and not easily handled. These and other difficulties are overcome by the process of the present invention.

An object of this invention is to present an improved method for the purification of titanium tetrachloride. A further object is to purify crude titanium tetrachloride in a convenient manner. Another object of the invention is to purify titanium tetrachloride by a process which involves minimum handling losses. These and other objects will become apparent from the following more complete description of this invention.

In its broadest aspects this invention contemplates a process for reducing the vanadium content of impure titanium tetrachloride by admixing said impure titanium tetrachloride and a lead base substance selected from the group consisting of lead amalgam, sodium lead alloy, calcium lead alloy and fumed litharge containing metallic lead, and distilling the treated titanium tetrachloride to recover the purified tetrachloride therefrom.

In a preferred embodiment of the present invention the impure titanium tetrachloride in the liquid form is admixed with small granules, turnings or shavings of one of the agents mentioned above. The treated solution is merely heated to boiling and distilled to obtain substantially vanadium free titanium tetrachloride. Most of the previously described methods of purification call for extended refluxing periods before the treating agents have had sufficient time to take effect, but according to this invention the only time required is that of heating the treated liquid to the boiling temperature and during the subsequent distilling operation to obtain the purified product.

The quantity of the treating agent required is dependent upon the type of the starting material employed. When large quantities of vanadium are present in the crude titanium tetrachloride, it is necessary to add large amounts of treating agents to obtain a purified product. The quantity of treating agent is also dependent upon the exposed surface area of the agent which comes in contact with the titanium tetrachloride. Table I shows typical amounts of agents required for the purification of crude titanium tetrachloride which contains 0.15% V.

EXAMPLE I 1,000 grams of crude titanium tetrachloride were placed in a distilling flask. 4 grams of sodium-lead alloy turnings, containing 3.0% metallic sodium, were added to the titanium tetrachloride at room temperature. The mixture was then rapidly heated to boiling and distilled at normal pressure out of contact with the outside atmosphere. The distillate was condensed and analyzed. The entire procedure was carried out in glass apparatus to prevent contamination. The purified titanium tetrachloride possessed a water-white color. The analytical data are presented in Table I.

EXAMPLE II

Example I was repeated using another 1,000 gram portion of the same crude titanium tetrachloride, but adding 8 grams of calcium lead alloy turnings, containing <1.0% metallic calcium, instead of sodium lead to the liquid. The analytical data are also presented in Table I.

EXAMPLE III

Example I was repeated using 30 grams of lead wool amalgam as a treating agent. Again the product was water-white. The data are presented in Table I.

EXAMPLE IV

Example I was repeated except that 5 grams of fumed litharge, containing 5% metallic lead were added to the titanium tetrachloride. The analysis of the purified titanium tetrachloride is presented in Table I.

It has been found that these lead base containing substances are effective only when the lead is present in conjunction with another substance. Metallic lead when used alone apparently has little effect upon the removal of vanadium from the crude titanium tetrachloride. In order to show this comparison a run was made using 30 grams of lead wool. The procedure used was similar to that described in the above example. The results of this run are also recorded in Table I.

*Table I*

| Example Number | Titanium Tetrachloride, grams | Treating Agent Added | | | Impurities in Titanium Tetrachloride Distillate, Per Cent Vanadium | Color |
|---|---|---|---|---|---|---|
| | | Grams | Agent | Form | | |
| 1 | 1,000 | 4 | sodium lead | turnings | <0.002 | water-white. |
| 2 | 1,000 | 8 | calcium lead | do | <0.002 | Do. |
| 3 | 1,000 | 30 | lead amalgam | wool | 0.002 | Do. |
| 4 | 1,000 | 5 | litharge containing metallic lead | fumed | 0.002 | Do. |
| Control | 1,000 | 30 | lead | wool | 0.01 | yellow. |

From the above examples it is evident that crude titanium tetrachloride may be purified particularly with respect to vanadium. The impurities, particularly vanadium, have been eliminated to the extent that the purified titanium tetrachloride becomes a commercially acceptable product. It has further been shown that the process is convenient because the treating agents do not form bulky and gummy still bottom. The titanium tetrachloride removed with the treating agents is easily recovered from the mass by heating, and is returned to the system. The ability to heat the treating agents without sticking to the walls of the vessel and without retaining an appreciable amount of titanium tetrachloride in the residual treating agents results in minimizing the titanium tetrachloride handling losses of the process.

This invention has been described in connection with certain details of operation and specific examples; but it is not, however, intended that such description and examples shall be interpreted as imposing limitations upon the scope insofar as they are not included in the accompanying claims which should be interpreted as broadly as possible.

We claim:

1. A method for reducing the vanadium content of impure titanium tetrachloride which comprises admixing crude titanium tetrachloride and a lead base substance selected from the group consisting of lead amalgam, sodium lead alloy, calcium lead alloy, and fumed litharge containing metallic lead, and distilling the treated titanium tetrachloride to recover the purified tetrachloride therefrom.

2. A method for reducing the vanadium content of impure titanium tetrachloride which comprises admixing crude titanium tetrachloride and lead amalgam, and distilling the treated titanium tetrachloride to recover the purified tetrachloride therefrom.

3. A method for reducing the vanadium content of impure titanium tetrachloride which comprises admixing crude titanium tetrachloride and sodium lead alloy, and distilling the treated titanium tetrachloride to recover the purified tetrachloride therefrom.

4. A method for reducing the vanadium content of impure titanium tetrachloride which comprises admixing crude titanium tetrachloride and calcium lead alloy, and distilling the treated titanium tetrachloride to recover the purified tetrachloride therefrom.

5. A method for reducing the vanadium content of impure titanium tetrachloride which comprises admixing crude titanium tetrachloride and fumed litharge containing metallic lead, and distilling the treated titanium tetrachloride to recover the purified tetrachloride therefrom.

WALTER K. NELSON.
HELMUT ESPENSCHIED.

REFERENCES CITED

The following references are of record in the file of this patent:

UNITED STATES PATENTS

| Number | Name | Date |
|---|---|---|
| 2,416,191 | Meister | Feb. 18, 1947 |